(12) United States Patent
Bauknecht et al.

(10) Patent No.: US 11,846,924 B2
(45) Date of Patent: Dec. 19, 2023

(54) PROCEDURE FOR CONFIGURING A MODULAR SAFETY SWITCHING DEVICE

(71) Applicant: Pilz GmbH & Co. KG, Ostfildern (DE)

(72) Inventors: Jochen Bauknecht, Ostfildern (DE); Florian Rotzinger, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 219 days.

(21) Appl. No.: 17/405,809

(22) Filed: Aug. 18, 2021

(65) Prior Publication Data
US 2022/0068578 A1 Mar. 3, 2022

(30) Foreign Application Priority Data
Sep. 1, 2020 (DE) .......................... 102020122874.0

(51) Int. Cl.
*G05B 19/042* (2006.01)
*G05B 9/02* (2006.01)
*F16P 3/08* (2006.01)

(52) U.S. Cl.
CPC .......... *G05B 19/0425* (2013.01); *G05B 9/02* (2013.01); *F16P 3/08* (2013.01); *G05B 2219/24093* (2013.01)

(58) Field of Classification Search
None
See application file for complete search history.

(56) References Cited

U.S. PATENT DOCUMENTS

| 2008/0219477 A1* | 9/2008 | Aiso | ............... H04H 60/04 |
| | | | 381/119 |
| 2009/0077270 A1 | 3/2009 | Chen et al. | |

FOREIGN PATENT DOCUMENTS

| DE | 10020074 A1 * | 11/2001 | ............... F16P 3/00 |
| DE | 10322273 A1 | 12/2004 | |

(Continued)

OTHER PUBLICATIONS

European Search Report in corresponding European Patent Application No. 21189482.9, dated Feb. 11, 2022, with English translation.

(Continued)

*Primary Examiner* — Hien D Khuu
(74) *Attorney, Agent, or Firm* — Edell, Shapiro & Finnan, LLC

(57) ABSTRACT

A method for configuring a modular safety switching apparatus having electronic modules comprises: a) selecting a configuration data set of the apparatus from a database and transmitting the configuration data set to a computing apparatus, wherein the configuration data set is processed by a computer program to generate a target configuration of the apparatus and the electronic modules; b) displaying the target configuration; c) plugging one of the electronic modules into one of the module slots of the module row; d) setting a rotary switch position of one or more rotary switches of the electronic module; e) determining an actual configuration of the electronic module configured according to c) and d); f) comparing the actual configuration with the target configuration; g) displaying whether a deviation exists between the actual configuration and the target configuration; and h) repeating c) to g) for each additional electronic module.

10 Claims, 1 Drawing Sheet

(56) References Cited

FOREIGN PATENT DOCUMENTS

| DE | 102007053078 A1 | * | 3/2009 | ......... G05B 19/0428 |
| DE | 202008017893 U1 | | 10/2010 | |
| DE | 202008017893 U1 | * | 12/2010 | ......... G05B 19/0426 |
| DE | 102011004312 A1 | * | 8/2012 | ........... G05B 19/042 |
| DE | 102011004312 B4 | | 11/2012 | |
| DE | 102016117385 A1 | * | 3/2018 | ............. G01R 31/04 |
| EP | 1936457 B1 | | 4/2009 | |

OTHER PUBLICATIONS

Office Action in corresponding German Patent Application No. 10 2020 122 874.0, dated Apr. 1, 2021, with English translation.

\* cited by examiner

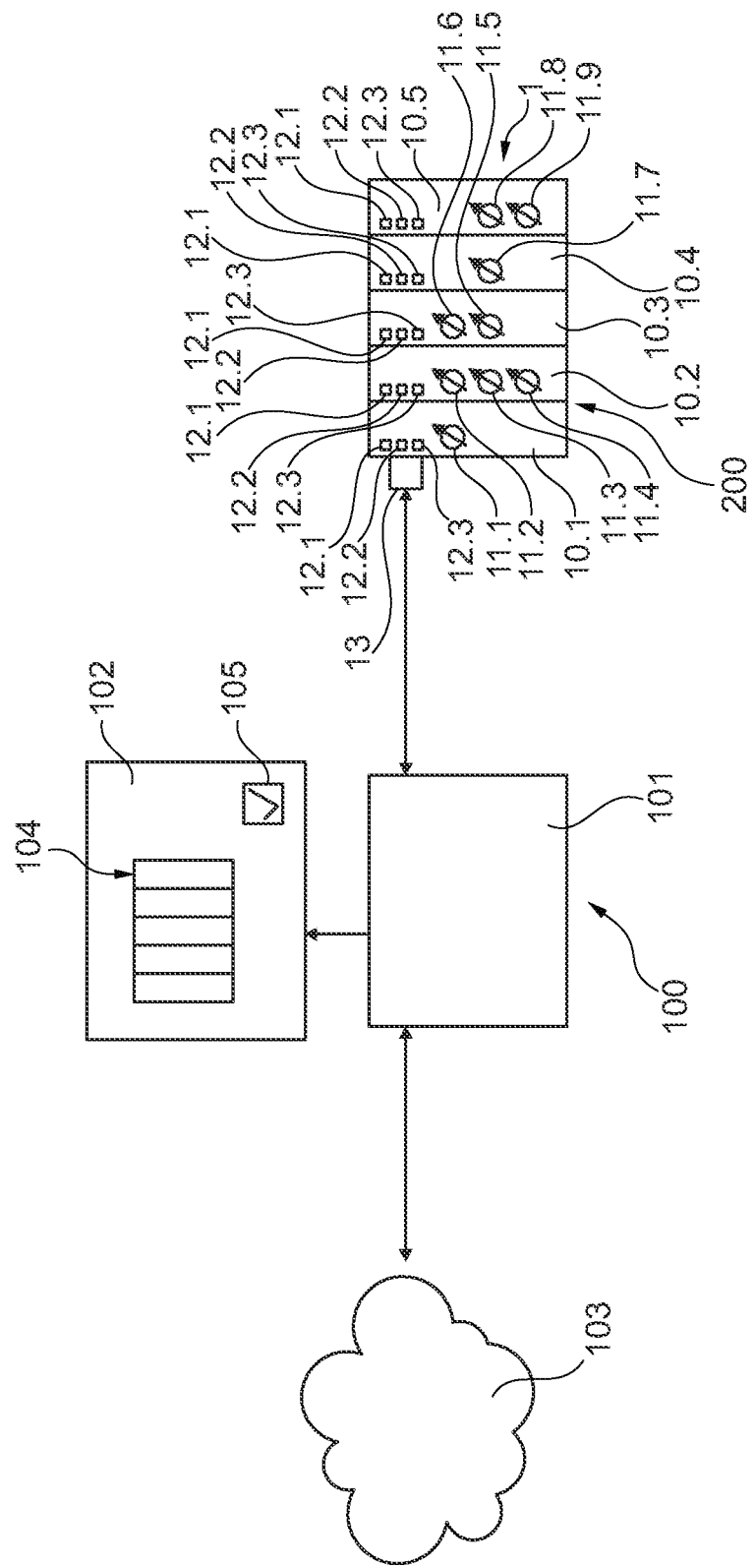

PROCEDURE FOR CONFIGURING A MODULAR SAFETY SWITCHING DEVICE

CROSS REFERENCE TO RELATED APPLICATIONS

This application claims foreign priority under 35 U.S.C. § 119(a)-(d) to Application No. DE 102020122874.0 filed on Sep. 1, 2020, the entire contents of which are hereby incorporated by reference.

TECHNICAL FIELD

The present disclosure relates to a method for configuring a modular safety switching apparatus.

BACKGROUND

Modular safety switching apparatuses are well-known in many different embodiments from the prior art. They serve, in particular, the purpose of safely transferring technical systems or machines into a harmless state for humans in the event of a hazardous situation. For this purpose corresponding signals of signal transmitters, which may be, for example, emergency OFF switches, emergency STOP switches, light grids, light barriers, pressure sensitive safety shutdown mats, safety door position switches, 3D laser scanners, etc., are received and reliably evaluated on the input side. On the output side one or more reliable output contacts of an output circuit are activated. In the event of a hazardous situation these output contacts are used to drive the actuators, such as, for example, contactors, valves, etc., such that a machine or technical system, which is connected to the actuators, can be transferred into a harmless state for humans.

Such safety switching apparatuses comprise several electronic modules that are arranged in at least one row of modules and have certain functionalities. The modular design of a safety switching apparatus offers the possibility of an application-specific configuration, in which several electronic modules are individually assembled, electrically connected to one another and configured such that they work together to provide the modular safety switching apparatus with the desired safety functions. Examples of electronic modules, from which modular safety switching apparatuses with very different safety functions can be assembled, are, among others, input modules, which can receive and, if necessary, can process input signals of one or more signal transmitters, such as, for example, input signals of sensors or emergency command devices; output modules, which can emit output signals to one or more actuators connected to the output modules; combined input and output modules (so-called I/O modules); control modules, which can control the matching of input modules to output modules; as well as interface modules, communication modules, fieldbus controllers, fieldbus couplers, etc.

In the course of configuring a modular safety switching apparatus, the electronic modules are lined up besides each other in the at least one row of modules and configured, in particular, by making settings on rotary switches, such as, for example, detent potentiometers, such that the electronic modules can provide the functionalities required for the specific use for which they were intended in terms of the safety aspects.

Depending on the specific use for which they were intended, the modular design of such modular safety switching apparatuses is often relatively complex, since in order to implement the desired safety functions, it is necessary, for example, to consider and implement AND logic operations. Correspondingly the configuration of the modular safety switching apparatus that is not carried out in an automated process is often difficult, time consuming and seriously flawed.

SUMMARY

An object of the disclosed method is to simplify the process of configuring a modular safety switching apparatus.

An inventive method for configuring a modular safety switching apparatus that has a plurality of electronic modules, which are arranged in at least one module row, comprises the steps of:

a) selecting a configuration data set of the modular safety switching apparatus from a plurality of configuration data sets, which are stored for retrieval in a configuration database, and transmitting the configuration data set to a computing apparatus, wherein the configuration data set is processed by a computer program, which is executed by the computing apparatus, such that a target configuration of the modular safety switching apparatus and the electronic modules is generated from the configuration data set, b) displaying the target configuration of the modular safety switching apparatus and the electronic modules on a display apparatus, c) plugging one of the electronic modules into one of the module slots of the row of modules, d) setting a rotary switch position of one or more rotary switches of the electronic module, e) determining an actual configuration of the electronic module, which is configured according to the steps c) and d), with the aid of the computer program, executed by the computing apparatus, f) comparing the actual configuration with the target configuration of the electronic module with the aid of the computer program, executed by the computing apparatus, g) displaying whether or not there is a deviation between the actual configuration and the target configuration of the electronic module; and, if so, repeating the steps c), e) to g), if the electronic module is plugged into an incorrect module slot of the row of modules, or repeating the steps d) to g), if a rotary switch position is set incorrectly, h) repeating the steps c) to g) for each additional electronic module of the modular safety switching apparatus.

The disclosed method makes it possible to greatly simplify the configuration of the modular safety switching apparatus, since information about the target configuration is displayed to a worker. In addition, a check is made as to whether there is a deviation between the actual configuration and the target configuration and any deviation is displayed correspondingly. Preferably instructions on troubleshooting are displayed by the display apparatus. Information about the actual configuration of the electronic modules of the modular safety switching apparatus can be transmitted, in particular, over a communication interface from the modular safety switching apparatus to the computing apparatus and can be evaluated with the aid of the computer program.

In order to further optimize the process sequence, it is advantageous for the steps E) to F) and the display, as to whether or not there is a deviation between the actual configuration and the target configuration of the electronic module, to be carried out in real time. In this way, the worker can detect immediately whether the electronic module, which has just been mounted in the row of modules, has been plugged into the correct module slot and whether the rotary switch settings have been made correctly.

In order to further simplify the assembly and configuration of the modular safety switching apparatus, there is the possibility in a preferred embodiment that the step of displaying the target configuration of the modular safety switching apparatus and the electronic modules on the display apparatus includes the display of a wiring diagram for wiring the electronic modules. Thus, the worker can capture not only the target configuration of the modular safety switching apparatus and the electronic modules, but also the associated wiring diagram on the display apparatus.

In a particularly preferred embodiment it is possible that the wiring diagram is generated, based on the configuration data set, by the computer program, which is executed by the computing apparatus. As an alternative, it is also possible, for example, that the wiring diagram is stored in the configuration database and is linked to the associated configuration data set and is read by the computing apparatus.

In an advantageous embodiment it is proposed that a central control module of the modular safety switching apparatus be mounted in the row of modules as the first electronic module. The rest of the electronic modules are selected from a large number of different types of electronic modules according to the application-specific requirements. The rest of the electronic modules may be, for example, input modules, which can reliably receive and, if necessary, process input signals of one or more signal transmitters, such as, for example, input signals of sensors or emergency command devices; output modules, which can reliably emit output signals to one or more actuators, connected to the output modules; combined input and output modules (so-called I/O modules), which have inputs and outputs and combine the functions thereof in one module; as well as interface modules, fieldbus controllers, fieldbus couplers, etc.

In a particularly advantageous embodiment it can be provided that the first electronic module checks the module slots of the row of modules, into which the rest of the electronic modules are plugged during the assembly process and checks the positions, into which the rotary switch(es) of the relevant electronic module have been moved. In so doing, this information is transmitted from the first electronic module to the computing apparatus. This information, which can be retrieved and transmitted over a communication interface, which is preferably part of the first electronic module, can be evaluated accordingly by the computer program.

In an advantageous further development there exists the possibility that by automatically activating one or more light units, preferably one or more light emitting diodes, of the electronic modules it is indicated whether or not the electronic modules have been plugged into the correct module slots. It can also be provided, for example, that by automatically activating the light units it is indicated whether or not the rotary switch positions of the rotary switches of the electronic modules have been set correctly. The activation or, more precisely, driving of the light units can be carried out preferably with the aid of the first electronic module, which forms the control module of the modular safety switching apparatus.

The series numbers of the electronic modules can preferably be read and stored in a non-volatile storage device of the computing apparatus or in the configuration database. The reading of the series numbers can be performed, for example, by the first electronic module or with the aid of a hand scanner.

BRIEF DESCRIPTION OF THE DRAWINGS

Other features and advantages of the disclosed method will become apparent from the following description of a preferred example embodiment with reference to the accompanying FIG. 1 which shows in a highly simplified schematic form a configuration system suitable for carrying out a method for configuring a modular safety switching apparatus.

DETAILED DESCRIPTION

Referring to FIG. 1, a modular safety switching apparatus 1 comprises a plurality n of electronic modules 10.1-10.5 arranged in at least one row of modules 200. In the example embodiment shown here, there are n=5 electronic modules 10.1-10.5. In this case, a first electronic module 10.1 forms a central control module of the modular safety switching apparatus 1 and is also often referred to as a head module. The rest of the electronic modules 10.2-10.5 are selected from a large number of different types of electronic modules according to the application specific requirements. The rest of the electronic modules 10.2-10.5 may be, for example, input modules, which can reliably receive and, if necessary, process input signals of one or more signal transmitters, such as, for example, input signals of sensors or emergency command devices; output modules, which can reliably emit output signals to one or more actuators, connected to the output modules; combined input and output modules (so-called I/O modules), which have inputs and outputs and combine the functions thereof in one module; as well as interface modules, fieldbus controllers, fieldbus couplers, etc.

The number and type of the electronic modules 10.1-10.5 that are used depends directly on the intended use and application of the modular safety switching apparatus 1 and, in particular, also on the safety level to be reached by the modular safety switching apparatus 1. In general, the task of the modular safety switching apparatus 1 is to shut off in a safety-oriented manner the actuators, connected to the modular safety switching apparatus 1, in the event of a hazardous situation, which is detected by the sensors and/or signaling devices, and to re-activate after the end of the hazardous situation.

Depending on the intended use of the modular safety switching apparatus 1 and the associated complexity, not only the configuration of the modular design, but also the configuration of the modular safety switching apparatus 1 may be very time consuming and difficult and, as a result, also seriously flawed. A method, by which the configuration process of the modular safety switching apparatus 1 can be greatly simplified, will be described below.

Referring again to FIG. 1, a configuration system 100 comprises a computing apparatus 101, to which a display apparatus 102 is connected. The computing apparatus 101 is in communication with a configuration database 103, in which configuration data sets and, optionally, other information, relating to the configurations of a plurality of modular safety switching apparatuses 1 and linked to the configuration data sets, are stored for retrieval. The configuration database 103 may be, for example, part of an online ordering system, which is preferably web based. Thus, the configuration data sets, which are stored for retrieval in the configuration database 103, correspond to the target configurations of the safety switching apparatuses 1 and the associated electronic modules 10.1-10.5.

After the initialization of an order for the fabrication of a modular safety switching apparatus 1, the configuration data set, which is associated with the modular safety switching apparatus 1 and is stored for retrieval in the configuration database 103, can be read by the computing apparatus 101 and can be further processed by a computer program that is executed by the computing apparatus 101. If provided, even other information, which may relate, in particular, to the design and configuration of the modular safety switching apparatus 1 and which is stored for retrieval in the configuration database 103 and is linked to the configuration data set, can also be read and further processed by the computing apparatus 101. For example, a wiring diagram and/or safety codes of the modular safety switching apparatus 1, which are linked to the associated configuration data set or may also form part of the configuration data set, can be read from the configuration database 103 by the computing apparatus 101 and can be further processed by the computer program.

Based on the configuration data set, the computer program, which is executed by the computing apparatus 101, generates a target configuration of the modular safety switching apparatus 1 and the associated electronic modules 10.1-10.5. A visual representation 104 of the target configuration is generated on the display apparatus 102. The visual representation shows the worker the assembly of the modular safety switching apparatus 1 from the individual electronic modules 10.1-10.5, in particular, their positions within the row of modules 200 and their rotary switch settings. The electronic modules 10.1-10.5 have in each case one or more rotary switches 11.1-11.9, which may be designed, in particular, as detent potentiometers. The correct setting of the rotational positions of the rotary switches 11.1-11.9 is important later for a flawless function of the modular safety switching apparatus 1. Preferably, the wiring diagram of the modular safety switching apparatus 1 can also be visualized on the display apparatus 102, in order to further simplify the configuration. With the aid of the visual representation 104 of the modular safety switching apparatus 1, which visual representation includes the settings of the rotational positions of the rotary switches 11.1-11.9 and preferably also the wiring diagram, it is very easy now to configure the electronic modules 10.1-10.5.

The method presented here can be used to check in real time as to whether the electronic modules 10.1-10.5 of the modular safety switching apparatus 1 are arranged, according to the configuration specifications, in the correct sequence in the row of modules 200 and whether the rotational positions of the rotary switches 11.1-11.9 are set correctly. Therefore, a self-diagnosis of the modular safety switching apparatus 1 is performed in real time as early as during the configuration.

Each modular safety switching apparatus 1 has a first electronic module 10.1 that forms the central control module and is always plugged preferably as the first one into a module slot that is provided for the first electronic module in the row of modules 200 during the assembly process. The computing apparatus 101 is in communication with the first electronic module 10.1 via a communication interface 13, which is preferably a component of the first electronic module 10.1. During the configuration process, information can be retrieved and transmitted to the computing apparatus 101 over this communication interface 13 and can be processed accordingly and evaluated by the computer program, which is executed by the computing apparatus 101.

Then, the rest of the electronic modules 10.2-10.5 of the modular safety switching apparatus 1 are plugged one after the other into the module slots, provided for this purpose in the row of modules 200. Furthermore, after each of the electronic modules 10.1-10.5 has been plugged in, the rotary switches 11.1-11.9 of the relevant electronic module 10.1-10.5 are set by the worker, according to the configuration specifications.

After the configuration of the first electronic module 10.1 in the associated module slot of the row of modules 200, the first electronic module can conduct preferably a self-test in order to check as to whether it was plugged into the correct module slot and whether the rotary switch or the rotary switches 11.1 of this first electronic module 10.1 were moved by the worker into the correct rotational position. If so, then the worker receives suitable feedback that is visualized preferably by the display apparatus 102. As an alternative or in addition, a corresponding visualization can also be carried out on the first electronic module 10.1. The latter will be explained in more detail further below. As an alternative, the checking as to whether the first electronic module 10.1 was plugged into the correct module slot and whether the rotary switch or the rotary switches 11.1 of the first electronic module 10.1 were moved by the worker into the correct rotational position, can also be carried out by the computer program, which is executed by the computing apparatus 101. The computing apparatus 101, which is in communication with the first electronic module 10.1 via the communication interface 13, can receive the corresponding information and can evaluate it with the computer program.

Then, the rest of the electronic modules 10.2-10.5 are plugged by the worker module-by-module into the associated module slots of the row of modules 200; and the rotary switch or the rotary switches 11.2-11.9 of these electronic modules 10.2-10.5 are set accordingly.

The first electronic module 10.1 tests in real time using corresponding queries the module slot of the row of modules 200, into which the respective electronic module 10.2-10.5 has been plugged by the worker during the assembly process and tests the positions, in which the rotary switch or the rotary switches 11.2-11.9 of the relevant electronic module 10.2-10.5 are located. This information is transmitted from the first electronic module 10.1 over the communication interface 13 to the computing apparatus 101 for purposes of further processing and is processed and evaluated by the computer program, which is executed by the computing apparatus 101. Furthermore, the series numbers of the electronic modules 10.1-10.5 are also preferably read and stored by the computing apparatus 101. The storage location may also be, for example, the configuration database 103. The reading of the series numbers can be performed, for example, automatically by the first electronic module 10.1, which reads the series numbers from the rest of the electronic modules 10.2-10.5. Conceivable is also a manual scanning of the series numbers of the electronic modules 10.1-10.5, in particular, by a hand scanner, prior to plugging the relevant electronic module 10.1-10.5 into the module slot that is provided for this purpose in the row of modules 200. The series numbers, which are read in this manner, are transmitted from the hand scanner to the computing apparatus 101.

As stated above, the computer program of the computing apparatus 101 can be used to further process the information, relating to the rest of the electronic modules 10.2-10.5 and acquired by the first electronic module 10.1 in real time. In so doing, the actual configuration is always compared with the target configuration. Any deviations and/or configuration errors, such as, for example, the selection of an incorrect module slot for the relevant electronic module 10.2-10.5 or faulty settings of the rotary switch 11.2-11.9 or the rotary switches 11.2-11.9 of the relevant electronic module 10.2-10.5, are indicated visually to the worker. This visualization can be carried out preferably by the display apparatus 102 of the computing device 101, so that the worker can be shown visually not only the presence of an error, but also preferably the corresponding modification instructions.

In addition or as an alternative, the visual indication of the correct assembly and configuration of the electronic modules 10.1-10.5 and any assembly and configuration errors can also be carried out by the electronic modules 10.1-10.5 themselves. For this purpose each of the electronic modules 10.1-10.5 has a number of colored light emitting diodes 12.1, 12.2, 12.3, which can glow preferably in various luminous colors. For example, each of the electronic modules 10.1-10.5 can have three colored light emitting diodes 12.1, 12.2, 12.3. On activation, a first light emitting diode 12.1 glows in the color red; a second light emitting diode 12.2 glows in the color yellow; and a third light emitting diode 12.3 glows in the color green. The light functions of the light emitting diodes 12.1, 12.2, 12.3 can also be combined to form a single RGB light emitting diode. Preferably the light emitting diodes 12.1, 12.2, 12.3, which form light units of the electronic modules 10.1-10.5 from a functional view, are also used as light indicators during normal operation of the modular safety switching apparatus 1.

These three light emitting diodes 12.1, 12.2, 12.3 can visualize, for example, the following information:

The first light emitting diode 12.1 of an electronic module 10.1-10.5 glows or flashes in the color red. The electronic module 10.1-10.5 was plugged into an incorrect module slot in the row of modules 200.

The second light emitting diode 12.2 of an electronic module 10.1-10.5 glows or flashes in the color yellow. The settings of one or more rotary switches 11.1-11.9 of the relevant electronic module 10.1-10.5 are incorrect.

The third light emitting diode 12.3 of an electronic module 10.1-10.5 glows or flashes in the color green. The electronic module 10.1-10.5 was plugged into the correct module slot in the row of modules 200 during the assembly process and all of the rotary switch positions are correct.

In the event of a fault, the light emitting diodes 12.1, 12.2, 12.3 do not make it possible to show directly a way to correct the associated fault. Instead, the light emitting diodes 12.1, 12.2, 12.3 serve primarily the purpose of finding as quickly as possible incorrectly mounted and/or configured electronic modules 10.1-10.5 and to detect at least the basic fault, i.e., an incorrectly placed electronic module 10.1-10.5 or incorrect rotary switch settings. Therefore, the combination of the light emitting diodes 12.1, 12.2, 12.3 to find very quickly the fault location with the display apparatus 102, by which the worker can be shown detailed ways to remedy the fault, is very advantageous.

Now, in the event of a fault, the worker changes, based on the instructions provided to him, the configuration of the relevant electronic module 10.1-10.5 accordingly; and the comparison between the target configuration and the actual configuration of the electronic module 10.1-10.5 is run again in real time. This comparison process between the actual and the target configuration of the electronic modules 10.1-10.5 and the display of any faults are executed iteratively until all of the electronic modules 10.1-10.5 of the modular safety switching apparatus 1 are correctly mounted and configured.

Then the worker gets feedback on the display apparatus 102, in particular, in a display area 105, provided for this purpose, and preferably also on the electronic modules 10.1-10.5 by the light emitting diodes 12.3 glowing in the color green.

On completion of the configuration process, the configuration can be stored for retrieval preferably in a non-volatile storage device of the modular safety switching apparatus 1. Preferably, upon completion of the production process of the modular safety switching apparatus 1, a data set can be generated that can also comprise, if necessary, the series numbers of the electronic modules 10.1-10.5 that are installed. In addition, the data set is stored for retrieval in the configuration database 103 or in another storage device, in particular, in a storage device of the ordering system.

The method, presented here, can be used to greatly simplify the configuration of the modular safety switching apparatus 1, since the worker is visually shown in real time whether an electronic module 10.1-10.5 was correctly plugged into the module slot that is provided for this purpose in the row of modules 200 and whether all of the rotary switch settings were made correctly. The method, presented here, allows for a process optimization that contributes to the cost savings during the production of modular safety switching apparatuses 1.

What is claimed is:

1. A method for configuring a modular safety switching apparatus having a plurality of electronic modules arranged in module slots of a module row, the method comprising:
    a) selecting a configuration data set of the modular safety switching apparatus from a plurality of configuration data sets that are stored for retrieval in a configuration database and transmitting the configuration data set to a computing apparatus, wherein the configuration data set is processed by a computer program executed by the computing apparatus such that a target configuration of the modular safety switching apparatus and the electronic modules is generated from the configuration data set;
    b) displaying the target configuration of the modular safety switching apparatus and the electronic modules on a display apparatus;
    c) plugging one of the electronic modules into one of the module slots of the module row;
    d) setting a rotary switch position of one or more rotary switches of the electronic module;
    e) determining an actual configuration of the electronic module configured according to c) and d) via the computer program executed by the computing apparatus;
    f) comparing the actual configuration with the target configuration of the electronic module via the computer program executed by the computing apparatus;
    g) displaying whether or not there is a deviation between the actual configuration and the target configuration of the electronic modules;
    h) repeating c) and e) to g) if the electronic module is plugged into an incorrect module slot of the module row, or repeating d) to g) if the rotary switch position of one or more rotary switches of the electronic module is set incorrectly; and
    i) repeating c) to h) for each additional electronic module of the modular safety switching apparatus.

2. The method of claim 1, wherein e), f), and g) are carried out in real time.

3. The method of claim 1, wherein b) comprises displaying a wiring diagram for wiring the electronic modules.

4. The method of claim 3, wherein the wiring diagram is generated by the computer program executed by the computing apparatus based on the configuration data set.

5. The method of claim 3, wherein the wiring diagram is stored in the configuration database and is linked to the associated configuration data set and is read by the computing apparatus.

6. The method of claim 1, wherein a central control module of the modular safety switching apparatus is mounted in the module row as a first electronic module.

7. The method of claim 6, further comprising:
checking, via the first electronic module, the module slots of the module row into which the rest of the electronic modules are plugged during assembly;
checking, via the first electronic module, positions into which the rotary switch or the rotary switches of the rest of the electronic modules are moved; and
transmitting from the first electronic module to the computing apparatus information related to checking performed by the first electronic module.

8. The method of claim 1, further comprising:
indicating whether or not the electronic modules have been plugged into correct module slots by automatically activating one or more light emitting diodes of the electronic modules.

9. The method of claim 8, further comprising:
indicating whether or not the rotary switch positions of the rotary switches of the electronic modules have been set correctly by automatically activating one or more of the light emitting diodes.

10. The method of claim 9, wherein series numbers of the electronic modules are read and stored in a non-volatile storage device of the computing apparatus or in the configuration database.

* * * * *